United States Patent
Seddiq et al.

(10) Patent No.: US 10,893,454 B2
(45) Date of Patent: *Jan. 12, 2021

(54) METHOD AND SYSTEM FOR PROVIDING A DISTANCE-BASED SCHEDULE FOR MONITORING ONE OR MORE PROPERTIES OF AN ASSET USING A PLURALITY OF MOBILE SENSOR NODES IN A WIRELESS SENSOR NETWORK

(71) Applicant: The King Abdulaziz City for Science and Technology, Riyadh (SA)

(72) Inventors: Yasser Mohammad Seddiq, Riyadh (SA); Mohammed Sulaiman BenSaleh, Riyadh (SA); Syed Manzoor Qasim, Riyadh (SA); Abdulfattah M Obeid, Riyadh (SA); Ahmad Yahya Al-nasheri, Riyadh (SA); Ahmad Masha Alotaibi, Riyadh (SA); Abdulaziz S Almazyad, Riyadh (SA)

(73) Assignee: THE KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/940,497

(22) Filed: Nov. 13, 2015

(65) Prior Publication Data

US 2017/0142628 A1    May 18, 2017

(51) Int. Cl.
*H04W 36/26* (2009.01)
*H04W 4/02* (2018.01)
(Continued)

(52) U.S. Cl.
CPC ............. *H04W 36/26* (2013.01); *H04L 43/08* (2013.01); *H04L 43/16* (2013.01); *H04W 4/025* (2013.01);
(Continued)

(58) Field of Classification Search
CPC .... G01M 3/2807; H04L 43/065; H04L 43/08; H04W 4/005; H04W 4/025; H04W 36/26;
(Continued)

(56) References Cited

U.S. PATENT DOCUMENTS

| 8,050,881 B1 * | 11/2011 | Yeung | ............. | A61B 5/0024 370/503 |
| 2007/0132836 A1 * | 6/2007 | Katz | ............. | G06Q 20/208 348/14.01 |

(Continued)

*Primary Examiner* — Khaled M Kassim
(74) *Attorney, Agent, or Firm* — Steven M. Shape; Dennemeyer & Associates, LLC

(57) ABSTRACT

The invention provides a method and system for monitoring one or more properties of an asset using a plurality of mobile sensor nodes. The method generates a distance-based schedule for the plurality of mobile sensor nodes for monitoring the one or more properties of the asset. The method, then, monitors a location of a first mobile sensor node in the asset. The data collection operation is then initiated at the first mobile sensor node based on the location of the first mobile sensor node in accordance with the distance-based schedule. The data collection operation of the first mobile sensor node is then managed based on the distance-based schedule and an energy status of the first mobile sensor node. Finally, the data pertaining to the one or more properties of the asset is collected from the plurality of mobile sensor nodes.

12 Claims, 7 Drawing Sheets

(51) Int. Cl.
*H04W 4/70* (2018.01)
*H04L 12/26* (2006.01)
*H04W 36/16* (2009.01)
*H04W 84/18* (2009.01)

(52) U.S. Cl.
CPC ............ *H04W 4/70* (2018.02); *H04W 36/165* (2013.01); *H04W 84/18* (2013.01)

(58) Field of Classification Search
CPC ... H04W 36/165; H04W 36/30; H04W 40/10; H04W 4/70; H04W 84/18; Y02D 30/70; Y02D 70/142; Y02D 70/166; Y02D 70/326
See application file for complete search history.

(56) References Cited

U.S. PATENT DOCUMENTS

| | | | | |
|---|---|---|---|---|
| 2007/0139183 A1* | 6/2007 | Kates | ................... | G08B 25/005 340/521 |
| 2008/0073466 A1* | 3/2008 | Mardirossian | .......... | B61L 29/30 246/125 |
| 2008/0250869 A1* | 10/2008 | Breed | ..................... | B60C 11/24 73/861.27 |
| 2009/0223285 A1* | 9/2009 | Windisch | ............ | G01M 3/2815 73/40.5 R |
| 2013/0043887 A1* | 2/2013 | Ziolkowski | ............ | G01V 15/00 324/649 |
| 2014/0070943 A1* | 3/2014 | Breed | ............... | B60R 21/01516 340/539.11 |
| 2014/0375800 A1* | 12/2014 | Lim | .................. | H04M 1/72538 348/143 |
| 2015/0179044 A1* | 6/2015 | Wu | ........................ | G08B 21/20 370/311 |
| 2016/0028605 A1* | 1/2016 | Gil | ........................ | H04W 4/006 709/213 |
| 2016/0100091 A1* | 4/2016 | Curiel Montoya | .... | G01R 31/00 348/82 |
| 2016/0165193 A1* | 6/2016 | Rasheed | .............. | G06K 9/3241 348/143 |
| 2016/0356665 A1* | 12/2016 | Felemban | ........... | G01M 3/2815 |
| 2016/0375888 A1* | 12/2016 | Allwardt | .............. | B60T 17/221 701/19 |
| 2017/0099357 A1* | 4/2017 | Haupt | ..................... | H04L 67/18 |

\* cited by examiner

METHOD AND SYSTEM FOR PROVIDING A DISTANCE-BASED SCHEDULE FOR MONITORING ONE OR MORE PROPERTIES OF AN ASSET USING A PLURALITY OF MOBILE SENSOR NODES IN A WIRELESS SENSOR NETWORK

FIELD OF THE INVENTION

The invention generally relates to the field of monitoring one or more properties of an asset and performing a data collection operation pertaining to the one or more properties of the asset using a plurality of mobile sensor nodes in a wireless sensor network. More specifically, the invention relates to a method and system for optimizing management of the data collection operation of the plurality of mobile sensor nodes performing the data collection operation.

BACKGROUND OF THE INVENTION

Water pipelines are generally subjected to anomalies such as leakage, bursts and corrosion that can have severe consequences for the environment and the economy. Therefore, in order to ensure the reliability of water pipelines, they must be monitored effectively. Wireless Sensor Networks (WSNs) have emerged as an effective technology for monitoring critical infrastructure such as water, oil and gas pipelines. These WSNs typically employ different type of sensors, such as temperature sensor, pressure sensor, acoustic sensor, flow sensor, and pH sensor for water pipeline monitoring. These sensors generate appropriate electrical signals based on the sensed phenomena. Generally, monitored parameters include temperature, humidity, flow and pressure. Therefore, selecting an appropriate sensor or sensing technique depends on many aspects such as the pipeline material and environment.

In the prior art, the WSNs generally employ a single mobile WSN node that performs the entire monitoring operation of a pipeline. A typical WSN node consists of a sensing subsystem, a processing subsystem, a communication subsystem and a power supply subsystem. The processing subsystem mainly includes a microcontroller and memory processes for storing the sensor data. The WSN node is allowed to move with the water current from the pipeline source down to the pipeline sink where the node is collected and its memory content is copied to a computer. The RF transceiver of the WSN node, which is an important part of communication subsystem receives commands from a central computer and transmits data collected by the static components of the WSN node to the central computer. Moreover, the power for the mobile WSN node is derived from a battery or an energy harvesting (scavenging) device.

Within the pipeline, the mobile WSN node locates measures and logs many events pertaining to the monitoring operation during its long trip within the pipeline. Consequently, the mobile WSN node must be equipped with a large memory size for accommodating the collected information and a long battery life to keep the mobile WSN node alive during its trip through the pipeline.

Moreover, the mobile WSN node must be highly reliable guaranteeing completion of the monitoring operation throughout the entire pipeline distance. In order to achieve this, the mobile WSN node is deployed with a huge physical size at a high cost. The huge size of the mobile WSN node causes the node to get trapped inside the pipeline, thus, blocking the fluid current.

Therefore, in light of the above, there is a need for an improved method and system for monitoring a long-distance pipeline using a plurality of mobile sensor nodes in WSNs.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
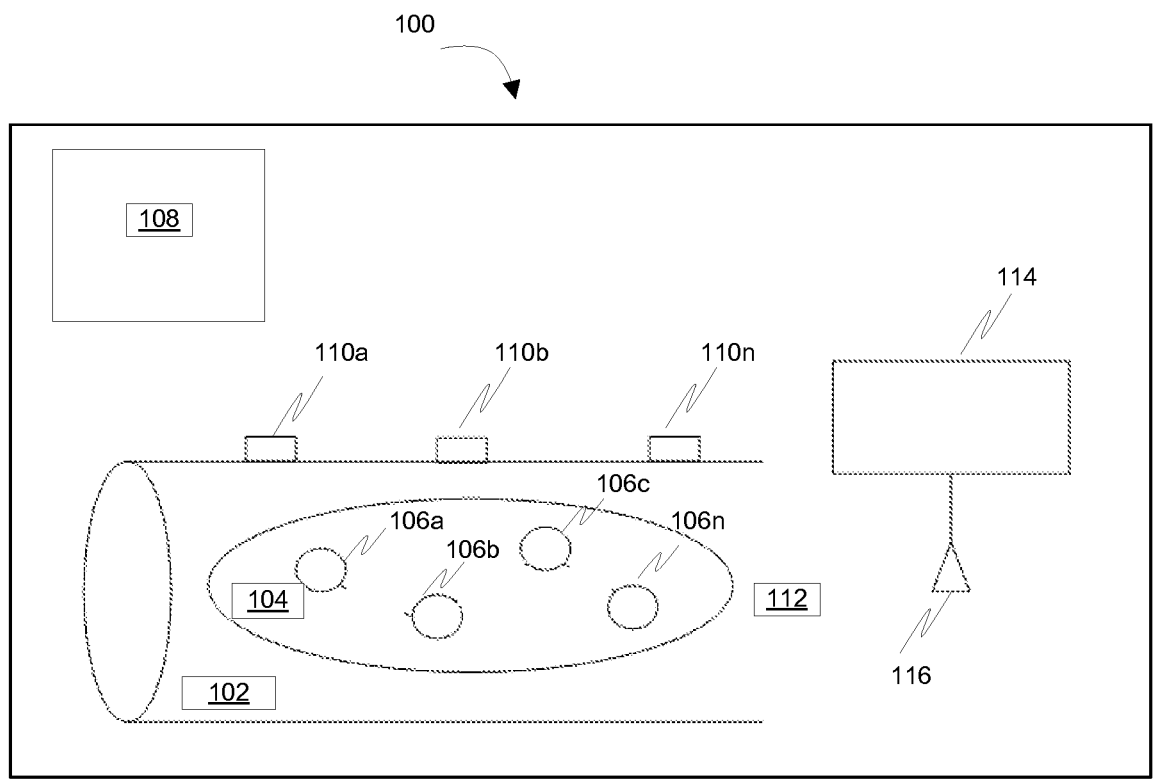
FIG. 1 illustrates a system for monitoring one or more properties of an asset such as a long-distance pipeline in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to monitoring of one or more properties of an asset such as a long-distance pipeline using a plurality of mobile sensor nodes.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for monitoring one or more properties of an asset such as a long-distance pipeline using a plurality of mobile sensor nodes. The method includes generating a distance-based schedule for the plurality of mobile sensor nodes for monitoring the one or more properties of the asset, wherein the distance-based schedule defines one of a location in the asset at which a mobile sensor node starts performing a data collection operation and a distance for which the mobile sensor node performs the data collection operation. The method, then, monitors a location of a first mobile sensor node of the plurality of mobile sensor nodes in the asset. The data collection operation is then initiated at the first mobile sensor node based on the distance-based schedule based on the location of the first mobile sensor node. The method further includes monitoring an energy status of the first mobile sensor node performing the data collection operation based on the distance-based schedule. The data collection operation of the first mobile sensor node is then managed based on the distance-based schedule and the energy status of the first mobile sensor node. Finally, the data pertaining to the one or more properties of the asset is collected from the plurality of mobile sensor nodes.

FIG. 1 illustrates a system 100 for monitoring one or more properties of an asset such as a long-distance pipeline 102 in accordance with an embodiment of the invention. The one or more properties of pipeline 102 can be, but not limited to, a leakage of pipeline 102, a burst of pipeline 102 and a corrosion of pipeline 102.

As illustrated, system 100 includes a plurality of mobile sensor nodes 106a-106n that flow freely within fluid 104 inside pipeline 102. Plurality of mobile sensor nodes 106a-106n can be configured to sense one or more of, but not limited to, a fluid flow, a fluid pressure and a fluid temperature. Accordingly, plurality of mobile sensor nodes 106a-106n can be one or more of, but not limited to, a temperature sensor node, a pressure sensor node, an acoustic sensor nodes, a flow sensor node and a pH sensor node.

Plurality of mobile sensor nodes 106a-106n are allowed to move with the current of fluid 104 and while doing so, perform a data collection operation pertaining to the one or more properties of pipeline 102. A mobile sensor node performing the data collection operation is said to be in an "active mode" while a mobile sensor node that has not initiated the data collection operation is said to be in an "inactive mode" or "sleeping mode. An "active mode" refers to a state when a mobile sensor node is powered-on whereas an "inactive mode" refers to a state when a mobile sensor node is in a partially powered-down state. Generally, only a single mobile sensor node is active at a point in time.

Each mobile sensor node of plurality of mobile sensor nodes 106a-106n performs the data collection operation based on a distance-based schedule and an energy status of the mobile sensor node. The energy status can be associated with one or more of, but not limited to, a battery status indicating the remaining battery capacity of the mobile sensor node and a memory size of the mobile sensor node.

System 100 includes a distance-based schedule generator 108 that generates the distance-based schedule for plurality of mobile sensor nodes 106a-106n for performing the data collection operation. The distance-based schedule for each mobile sensor node includes a location in pipeline 102 at which the mobile sensor node starts performing the data collection operation and a distance for which the mobile sensor node must perform the data collection operation.

System 100 also includes a plurality of location tracking units 110a-110n deployed across outer surface of pipeline 102. Plurality of location tracking components 110a-1100n, can be, but not limited to, radio frequency identifier (RFID) tags. Plurality of location tracking units 110a-110n track the location of each mobile sensor node of plurality of mobile sensor nodes 106a-106n in pipeline 102 and communicate the location information to the mobile sensor node for performing the data collection operation based on the distance-based schedule and the energy status of the mobile sensor node.

Further, each mobile sensor node of plurality of mobile sensor nodes 106a-106n is equipped with various components for enabling the mobile sensor node to perform the data collection operation based on the distance-based schedule and the energy status of the mobile sensor node. The various components are further described in detail in conjunction with FIG. 2.

After performing the data collection operation, each mobile sensor node shuts down all the components and goes into a "cut-off mode". A "cut-off mode" refers to a state when a mobile sensor node, after completing the data collection operation, is completely powered-off and does not wake up until it reaches pipeline sink 112.

On reaching pipeline sink 112, plurality of mobile sensor nodes 106a-106n dump the collected data in a data collector 114. Plurality of mobile sensor nodes 106a-106n communicate with data collector 114 through a wireless communication network means 116. Wireless communication network means 116, can be, but not limited to, a Wi-Fi antenna for receiving the data collected from plurality of mobile sensor nodes 106a-106n. The data collected by data collector 114, is then, subjected to an offline analysis to identify the one or more properties associated with pipeline 102.

Figure 2:
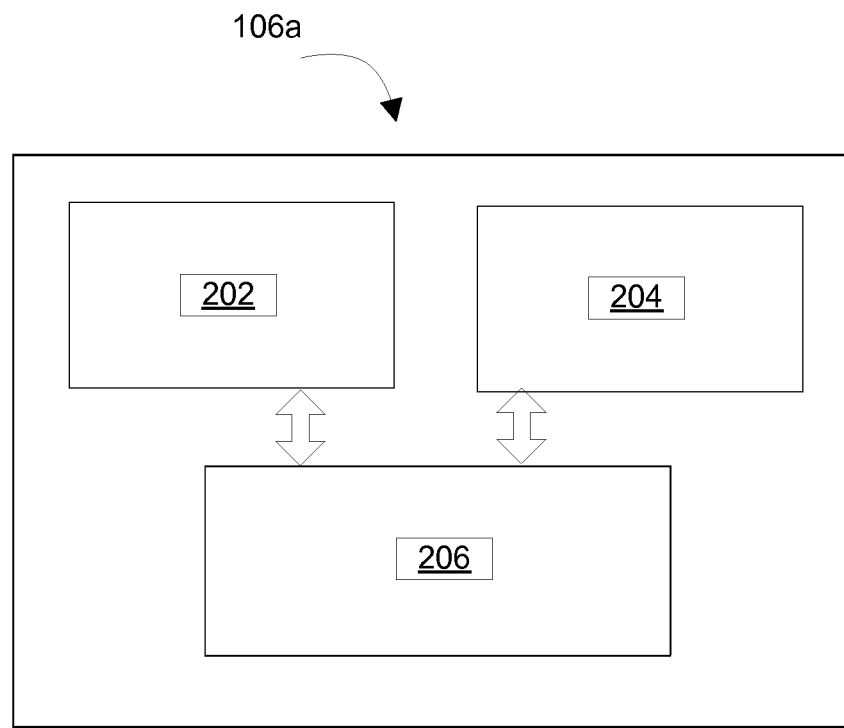
FIG. 2 illustrates various components present within a mobile sensor node for enabling the mobile sensor node to perform the data collection operation pertaining to one or more properties of a long-distance pipeline in accordance with an embodiment of the invention.

FIG. 2 illustrates various components present within mobile sensor node 106a for enabling mobile sensor node 106a to perform the data collection operation pertaining to the one or more properties of pipeline 102 in accordance with an embodiment of the invention.

As illustrated, mobile sensor node 106a includes a memory 202, an energy status monitor 204 and a processor 206.

Energy status monitor 204 is configured to continuously monitor an energy status of mobile sensor node 106a while mobile sensor node 106a is performing the data collection operation. The energy status corresponds to one or more of, but not limited to, a battery status and an available memory size of mobile sensor node 106a.

Processor 206 is communicatively coupled to memory 202, energy status monitor 204 and distance-based schedule generator 108.

In accordance with an embodiment of the invention, mobile sensor node 106a is currently in an active mode while remaining mobile sensor nodes 106b-106n of plurality of mobile sensor nodes 106a-106n are in an inactive mode.

Processor 206 monitors a location of mobile sensor node 106a within pipeline 102 using plurality of location tracking assets 110a-110n and then initiates the data collection operation at mobile sensor node 106a according to the distance-based schedule based on the location of mobile sensor node 106a.

While mobile sensor node 106*a* is performing the data collection operation, energy status monitor 204 that is continuously monitoring the energy status of mobile sensor node 106*a* communicates the energy status to processor 206. Processor 206, then, manages the data collection operation of mobile sensor node 106*a* based on the distance-based schedule and the energy status of mobile sensor node 106*a* as follows.

Processor 206 checks the energy status of mobile sensor node 106*a* communicated to processor 206 against an energy threshold. The energy threshold can be, but not limited to, a minimum value of energy required for mobile sensor node 106*a* to perform the data collection operation. The energy threshold may be predefined for each mobile sensor node of plurality of mobile sensor nodes 106*a*-106*n* based on one or more of, but not limited to, a battery status and an available memory size for the mobile sensor node.

When the energy status of mobile sensor node 106*a* is more than the energy threshold, processor 206 allows mobile sensor node 106*a* to continue performing the data collection operation beyond the distance for which mobile sensor node 106*a* is required to perform the data collection operation according to the distance-based schedule. Also, this extension may result in an overlap with a distance defined for another mobile sensor node for performing the data collection operation. On the other hand, when the energy status of mobile sensor node 106*a* is less than the energy threshold, processor 206 is configured to allow mobile sensor node 106*a* to stop the data collection operation before the distance, for which mobile sensor node 106*a* is required to perform the data collection operation according to the distance-based schedule, gets covered.

Meanwhile, the data collection operation is also initiated at another mobile sensor node 106*b* based on a location of mobile sensor node 106*b* within pipeline 102 according to the distance-based schedule for mobile sensor node 106*b*.

Processor 206, then, stores the data collected in memory 202 of mobile sensor node 106*a* with one or more of a time stamp and a location stamp in memory 202.

Thus, each mobile sensor node of plurality of mobile sensor nodes 106*a*-106*n* awakens at a corresponding location within pipeline 102 as defined in the distance-based schedule for the mobile sensor node and starts performing the data collection operation based on a corresponding distance and energy status of the mobile sensor node.

After performing the data collection operation, mobile sensor node 106*a* shuts down all the components and goes into the cut-off mode until it reaches pipeline sink 112. At pipeline sink 112, mobile sensor node 106*a* dumps the data in data collector 114 using wireless communication network means 116.

Figure 3:
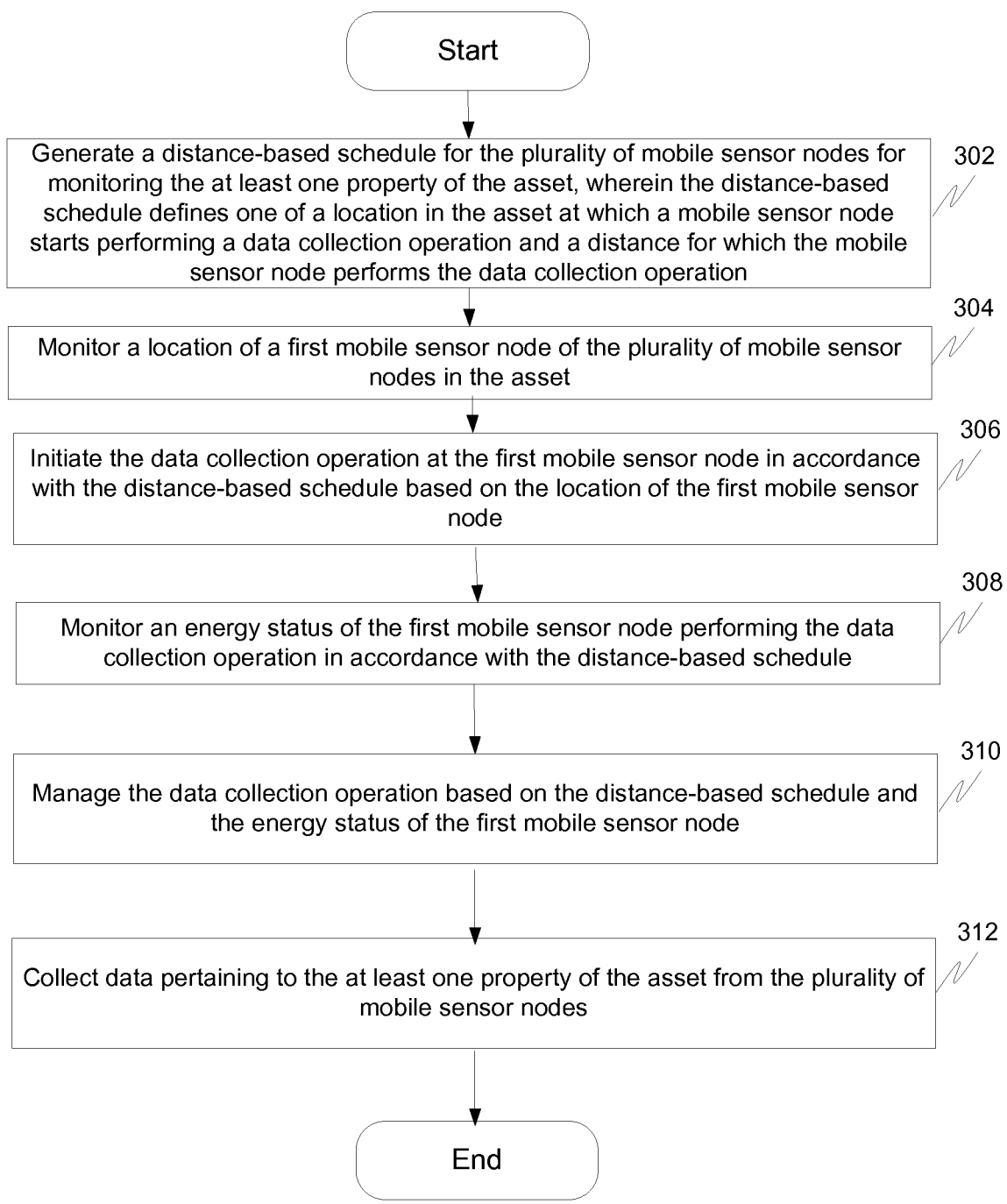
FIG. 3 illustrates a flowchart of a method for monitoring one or more properties of a long-distance pipeline using a plurality of mobile sensor nodes in accordance with an embodiment of the invention.

FIG. 3 illustrates a flowchart of a method for monitoring the one or more properties of pipeline 102 using plurality of mobile sensor nodes 106*a*-106*n* in accordance with an embodiment of the invention.

As step 302, a distance-based schedule is generated for plurality of mobile sensor nodes 106*a*-106*n* for monitoring the one or more properties of pipeline 102. The distance-based schedule defines a location within pipeline 102 at which a mobile sensor node starts performing the data collection operation and as distance for which the mobile sensor node performs the data collection operation. Moving on, at step 304, a location of mobile sensor node 106*a* of plurality of mobile sensor nodes 106*a*-106*n* within pipeline 102 is monitored. After determining the location of mobile sensor node 106*a* within pipeline 102, at step 306, the data collection operation is initiated at mobile sensor node 106*a* of plurality of mobile sensor nodes 106*a*-106*n* based on the location according to the distance-based schedule for mobile sensor node 106*a*. While mobile sensor node 106*a* is performing the data collection operation based on the distance-based schedule, at step 308, an energy status of mobile sensor node 106*a* is monitored and communicated to processor 206 of mobile sensor node 106*a*. Thereafter, at step 310, the data collection operation of mobile sensor node 106*a* is managed based on the distance-based schedule and the energy status of mobile sensor node 106*a*. Step 310 is further described in detail in conjunction with FIG. 4.

Once the data pertaining to the one or more properties of pipeline 102 is collected by plurality of mobile sensor nodes 106*a*-106*n*, at step 312, the collected data is dumped in data collector 114 when plurality of mobile sensor nodes 106*a*-106*n* reach pipeline sink 112.

Figure 4:
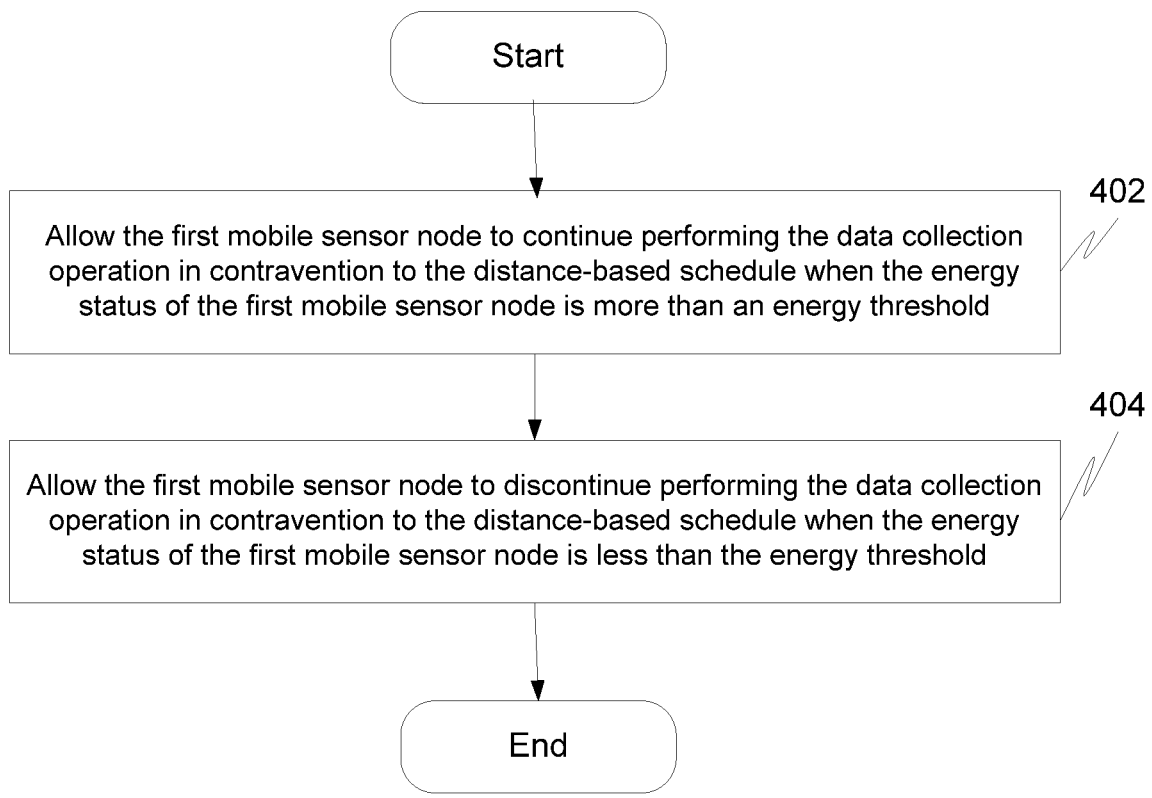
FIG. 4 illustrates a flowchart of a method for managing a data collection operation of a mobile sensor node in accordance with an embodiment of the invention.

FIG. 4 illustrates a flowchart of a method for managing the data collection operation of mobile sensor node 106*a* in accordance with an embodiment of the invention.

On receiving the energy status of mobile sensor node 106*a* at processor 206, the energy status of mobile sensor node 106*a* is checked with an energy threshold. The energy threshold can be, but not limited to, a minimum value of energy required for mobile sensor node 106*a* to perform the data collection operation. The energy threshold may be predefined for each mobile sensor node of plurality of mobile sensor nodes 106*a*-106*n* based on one or more of, but not limited to, a battery status and an available memory size for the mobile sensor node.

At step 402, when the energy status of mobile sensor node 106*a* is more than the energy threshold, mobile sensor node 106*a* is allowed to continue performing the data collection operation beyond the distance for which mobile sensor node 106*a* is required to perform the data collection operation according to the distance-based schedule. On the other hand, at step 404, when the energy status of mobile sensor node 106*a* is less than the energy threshold, mobile sensor node 106*a* is allowed to stop the data collection operation before the distance, for which mobile sensor node 106*a* is required to perform the data collection operation according to the distance-based schedule, gets covered.

Meanwhile, the data collection operation is also initiated at another mobile sensor node 106*b* based on a location of mobile sensor node 106*b* within pipeline 102 according to the distance-based schedule for mobile sensor node 106*b*

Thus, each mobile sensor node of plurality of mobile sensor nodes 106*a*-106*n* awakens at a specific location within pipeline 102 as defined in the distance-based schedule for the mobile sensor node and starts performing the data collection operation based on the energy status and the distance-based schedule of the mobile sensor node.

The method and system are further described in detail in accordance with an exemplary embodiment of the invention.

Figure 5A:
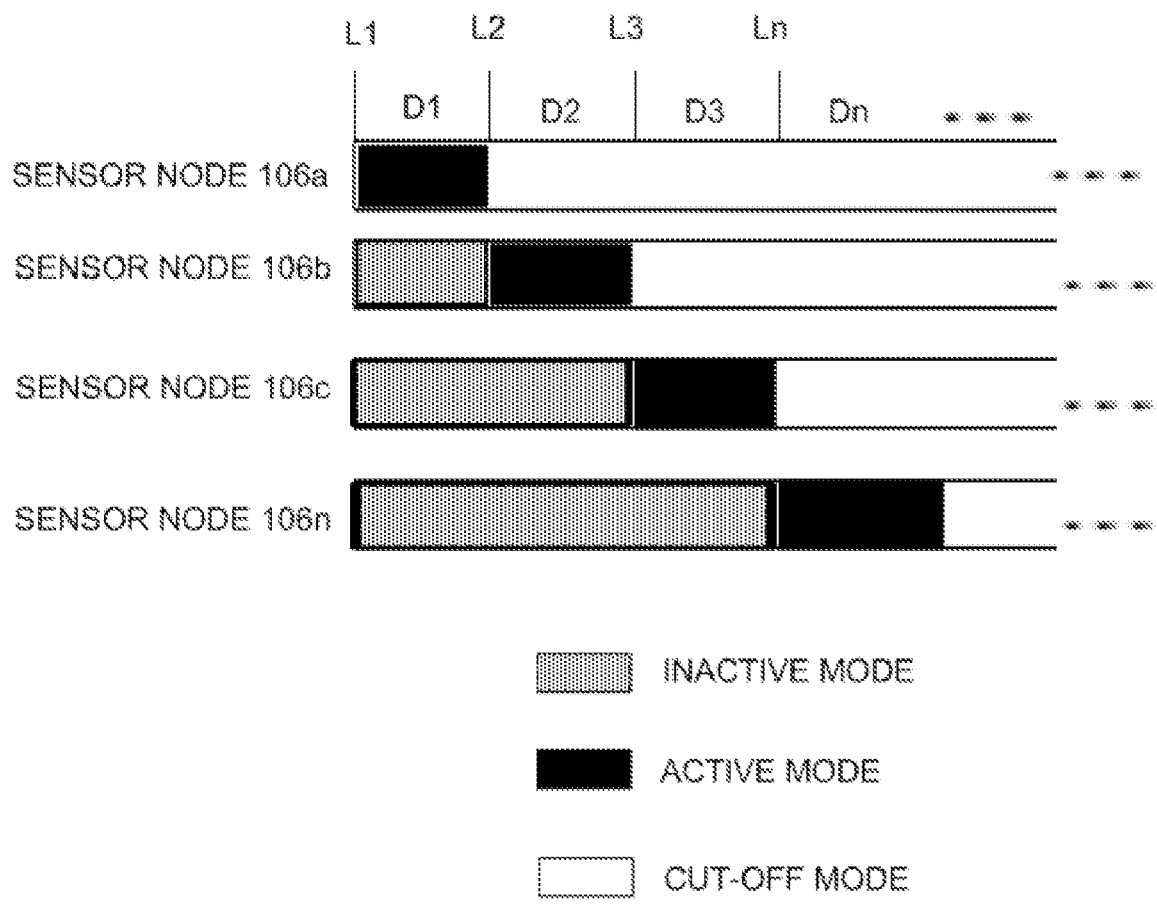
FIG. 5a illustrates a distance-based schedule for managing a data collection operation of a plurality of mobile sensor nodes in accordance with an exemplary embodiment of the invention.

FIG. 5*a* illustrates a distance-based schedule for managing the data collection operation of plurality of mobile sensor nodes 106*a*-106*n* in accordance with the exemplary embodiment of the invention.

As illustrated in FIG. 5*a*, each mobile sensor node is pre-programmed to wake up from an inactive mode to an active mode at a specific location of the mobile sensor node within pipeline 102 for performing the data collection operation. For example, mobile sensor node 106*a* is pre-programmed to wake up at a location L1, mobile sensor node 106*b* is pre-programmed to wake up at a location L2, mobile sensor node 106*c* is pre-programmed to wake up at a location L3 and so on. Further, mobile sensor node 106*a* is pre-programmed to perform the data collection operation for a distance D1, mobile sensor node 106b is pre-programmed to perform the data collection operation for a distance D2, mobile sensor node 106c is pre-programmed to perform the data collection operation for a distance D3 and so on.

In a typical scenario, mobile sensor node 106a, that is currently active, continuously measures and logs readings pertaining to the one or more properties of pipeline 102 according to distance D1. After distance D1 gets covered, mobile sensor node 106a stops performing the data collection operation. For the remaining distances D2-D3 and D3-Dn, mobile sensor node 106a shuts down all the components and goes into the cut-off mode.

Simultaneously, at location L2 which corresponds to the end of distance D1, mobile sensor node 106b wakes up from the inactive mode as indicated and starts performing the data collection operation according to distance D2.

Similarly, mobile sensor node 106b stops performing the data collection operation when distance D2 gets covered while mobile sensor node 106c wakes up at location L3 and starts performing the data collection operation according to distance D3.

Thus, each mobile sensor node of plurality of mobile sensor nodes 106a-106n that are in an inactive mode are pre-programmed to wake up at a certain location within pipeline 102 to perform the data collection operation for a pre-programmed distance and then stop performing the data collection operation once the pre-programmed distance gets covered.

Figure 5B:
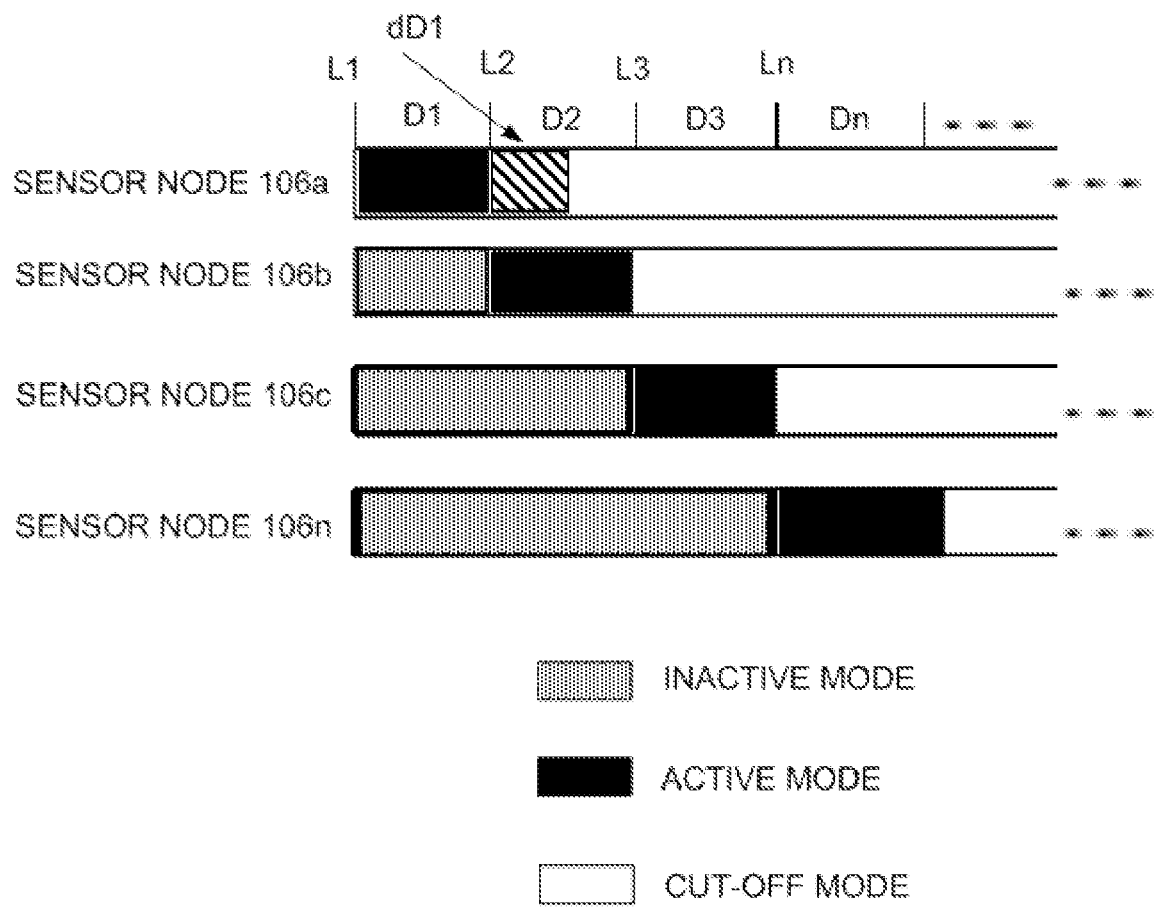
FIGS. 5b and 5c illustrate managing a data collection operation for a plurality of mobile sensor nodes based on an energy status and distance-based schedule in accordance with an exemplary embodiment of the invention.

However, in accordance with the invention, when mobile sensor node 106a has enough energy and memory to operate beyond distance D1, mobile sensor node 106a continues performing the data collection operation for a distance dD1 even after distance D1 gets covered as illustrated in FIG. 5b. The extended distance dD1 may result in an overlap with distance D2 for which mobile sensor node 106b is required to perform the data collection operation.

Figure 5C:
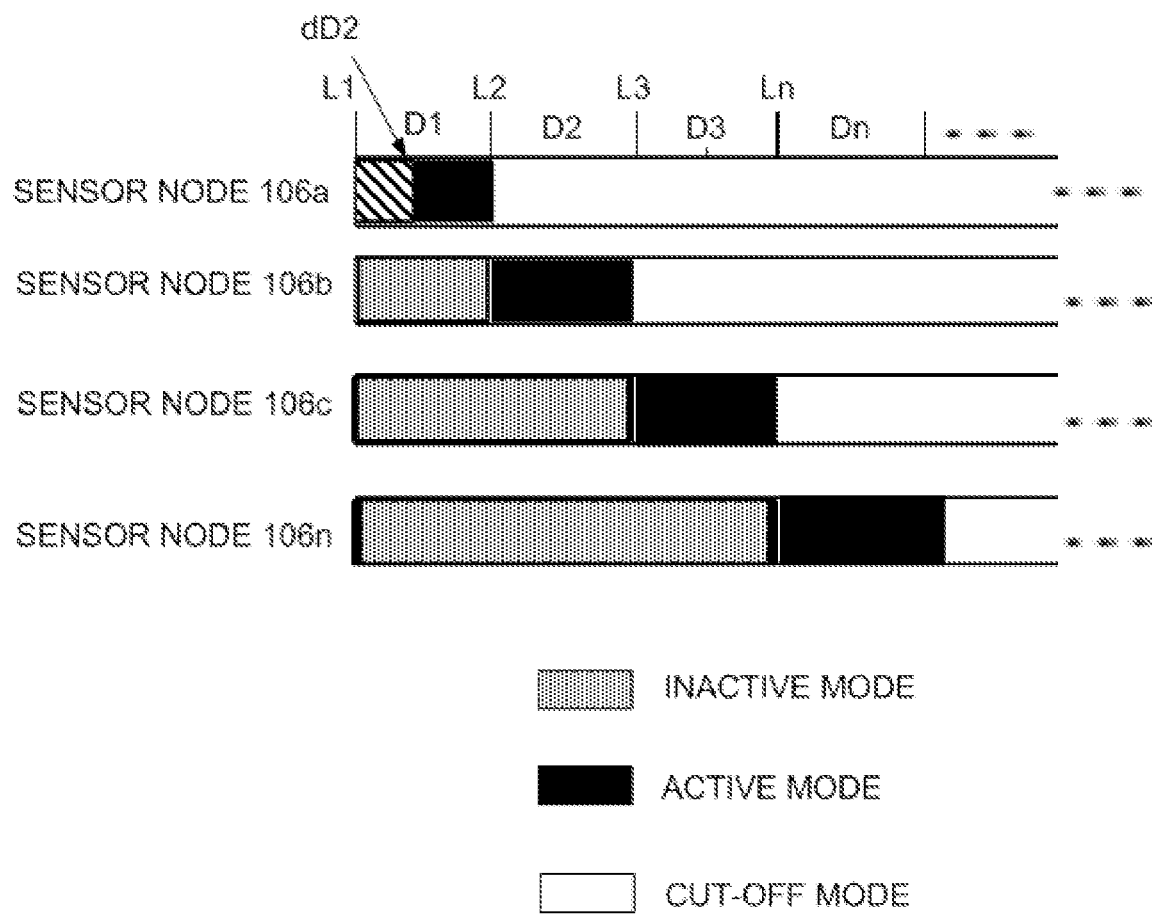

On the other hand, when mobile sensor node 106a does not have enough energy to complete the data collection operation according to distance D1, mobile sensor node 106a stops performing the data collection operation after a distance dD2 before distance D1 gets covered as illustrated in FIG. 5c. As usual, mobile sensor node 106b wakes up at location L2 and starts performing the data collection operation according to distance D2 and the energy status of mobile sensor node 106b.

Once each mobile sensor node of plurality of mobile sensor nodes 106a-106n has completed the data collection operation, the mobile sensor node completely shuts down all components and goes into the cut-off mode and will never wake up again until plurality of mobile sensor nodes 106a-106n reach pipeline sink 112.

Finally, at pipeline sink 112, plurality of mobile sensor nodes 106a-106n dump the data collected at data collector 114 using wireless communication network means 116.

Various advantages provided by the invention are outlined below.

The invention helps in reducing a memory size of each mobile sensor node as each mobile sensor node is configured to perform the data collection operation only for a certain distance within the pipeline based on the energy status of the mobile sensor node and not for the entire length of the pipeline. Hence, each mobile sensor node can have a smaller battery and memory size that significantly reduces the overall physical size of the mobile sensor node, thus, reducing the risk of the mobile sensor node getting trapped inside the pipeline.

Also, the invention reduces risk due to faulty mobile sensor nodes as the invention deploys multiple mobile sensor nodes for the monitoring and data collection operations. Thus, a faulty mobile sensor node that is performing the data collection operation only misses measurements during the data collection operation that fall during its pre-programmed distance while the data collection operations for the rest of the pipeline are taken care of by the remaining active mobile sensor nodes. Thus, the invention enhances coverage for monitoring as well as system reliability.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for monitoring at least one property of an asset using a plurality of mobile sensor nodes, the method comprising:

generating a distance-based schedule for the plurality of mobile sensor nodes for monitoring the at least one property of the asset, wherein each mobile sensor node of the plurality of mobile sensor nodes is movable between an inactive mode and an active mode, wherein each mobile sensor is configured to perform a data collection operation pertaining to the at least one property when in the active mode as each mobile sensor node moves along a length of the asset and the distance-based schedule defines one of a location in the asset at which a first mobile sensor node of the plurality of mobile sensor nodes starts performing the data collection operation and a distance along the length of the asset for which the first mobile sensor node performs the data collection operation;

monitoring the location of the first mobile sensor node in the asset;

initiating the data collection operation of the first mobile sensor node in accordance with the distance-based schedule based on the location of the first mobile sensor node;

monitoring an energy status of the first mobile sensor node performing the data collection operation in accordance with the distance-based schedule;

managing the data collection operation based on the distance-based schedule and the energy status of the first mobile sensor node; and collecting data pertaining to the at least one property of the asset from the plurality of mobile sensor nodes.

2. The method according to claim 1, wherein the asset is a long-distance pipeline.

3. The method according to claim 2, wherein the at least one property comprises at least one of a leakage of the pipeline, a burst of the pipeline and a corrosion of the pipeline.

4. The method according to claim 1, wherein the first mobile sensor node is configured to sense at least one of a flow, a pressure and a fluid temperature.

5. The method according to claim 1, wherein managing the data collection operation further comprises:
allowing the first mobile sensor node to continue performing the data collection operation in contravention to the distance-based schedule when the energy status of the first mobile sensor node is more than an energy threshold; and
allowing the first mobile sensor node to discontinue performing the data collection operation in contravention to the distance-based schedule when the energy status of the first mobile sensor node is less than the energy threshold.

6. The method according to claim 1, wherein managing the data collection operation further comprises initiating the data collection operation at a second mobile sensor node of the plurality of mobile sensor nodes in accordance with the distance-based schedule based on a location of the second mobile sensor node.

7. The method according to claim 1, wherein an energy status of the first mobile sensor node corresponds to at least one of a battery status and an available memory size of the first mobile sensor node.

8. A system for monitoring at least one property of an asset, the system comprising:
a plurality of mobile sensor nodes, each mobile sensor node of the plurality of mobile sensor nodes movable between an inactive mode and an active mode, and configured to perform a data collection operation pertaining to the at least one property when in the active mode as each mobile sensor node moves along a length of the asset;
a distance-based schedule generator generating a distance-based schedule for the plurality of mobile sensor nodes for monitoring the at least one property of the asset, wherein the distance-based schedule defines one of a location in the asset at which a first mobile sensor node of the plurality of mobile sensor nodes starts performing the data collection operation and a distance along the length of the asset for which the first mobile sensor node performs the data collection operation;
a plurality of location tracking units deployed across the asset, wherein the plurality of location tracking units monitor location of each mobile sensor node,
wherein the first mobile sensor node comprises:
a memory;
an energy status monitor configured to monitor an energy status of the first mobile sensor node; and
a processor communicatively coupled with the distance-based schedule generator, the plurality of location tracking units, the energy status monitor and the memory, wherein the processor is configured to:
initiate the data collection operation at the first mobile sensor node in accordance with the distance-based schedule based on the location of the first mobile sensor node; and
manage the data collection operation of the first mobile sensor node based on the distance-based schedule and the energy status of the first mobile sensor node; and
a data collector configured to collect data pertaining to the at least one property of the asset from the plurality of mobile sensor nodes.

9. The system according to claim 8, wherein the processor is configured to:
allow the first mobile sensor node to continue performing the data collection operation in contravention to the distance-based schedule when the energy status of the first mobile sensor node is more than an energy threshold; and
allow the first mobile sensor node to discontinue performing the data collection operation in contravention to the distance-based schedule when the energy status of the first mobile sensor node is less than the energy threshold.

10. The system according to claim 8, wherein the processor is configured to store data pertaining to the at least one property of the asset with at least one of a time stamp and a location stamp in the memory of the mobile sensor node.

11. The system according to claim 8, wherein the plurality of location tracking units communicates location information of the mobile sensor node to the processor of the mobile sensor node through a wired communication network.

12. The system according to claim 11, wherein the processor is configured to compute a distance traveled by the mobile sensor node based on the location information received for the mobile sensor node to perform the data collection operation in accordance with the distance-based schedule.

* * * * *